United States Patent
Prokop et al.

(10) Patent No.: US 11,843,695 B2
(45) Date of Patent: Dec. 12, 2023

(54) DISTRIBUTED ENTROPY SYSTEM AND METHOD

(71) Applicant: Visa International Service Association, San Francisco, CA (US)

(72) Inventors: Bartlomiej Piotr Prokop, Belfast (IE); Fiachra Murray, Belfast (IE); Thomas Looney, Belfast (IE); Peter Lennon, Belfast (IE)

(73) Assignee: Visa International Service Association, San Francisco, CA (US)

(*) Notice: Subject to any disclaimer, the term of this patent is extended or adjusted under 35 U.S.C. 154(b) by 294 days.

(21) Appl. No.: 17/291,590

(22) PCT Filed: Nov. 9, 2018

(86) PCT No.: PCT/US2018/060003
§ 371 (c)(1),
(2) Date: May 5, 2021

(87) PCT Pub. No.: WO2020/096614
PCT Pub. Date: May 14, 2020

(65) Prior Publication Data
US 2021/0409207 A1     Dec. 30, 2021

(51) Int. Cl.
*H04L 9/40* (2022.01)
*H04L 9/08* (2006.01)
*H04L 9/32* (2006.01)

(52) U.S. Cl.
CPC .......... *H04L 9/0869* (2013.01); *H04L 9/0825* (2013.01); *H04L 9/3297* (2013.01)

(58) Field of Classification Search
CPC .... H04L 9/0869; H04L 9/0825; H04L 9/3297
See application file for complete search history.

(56) References Cited

U.S. PATENT DOCUMENTS

| | | | |
|---|---|---|---|
| 9,037,624 B1* | 5/2015 | Hars | G06F 7/588 708/254 |
| 2008/0189356 A1 | 8/2008 | Thomas et al. | |
| 2011/0022916 A1 | 1/2011 | Desai et al. | |
| 2011/0047545 A1 | 2/2011 | Ellison et al. | |
| 2013/0086136 A1 | 4/2013 | Inglett et al. | |
| 2014/0040336 A1 | 2/2014 | Inglett et al. | |
| 2015/0277856 A1 | 10/2015 | Payne et al. | |
| 2016/0188384 A1 | 6/2016 | Shah | |

(Continued)

OTHER PUBLICATIONS

CN 201880099364.6, "Office Action", dated May 26, 2021, 1 page.

(Continued)

*Primary Examiner* — Thaddeus J Plecha
(74) *Attorney, Agent, or Firm* — Kilpatrick Townsend & Stockton LLP (57) ABSTRACT

A method is disclosed. The method includes receiving, by a computer node in a network including a plurality of computer nodes, a plurality of data values from the plurality of computer nodes. Each computer node can create a data value based on a time that the computer node in the plurality of computer nodes takes to perform a function. The computer node can then provide the data values or derivatives thereof as random values to an entropy pool of random values. The computer node can then select a random value from the entropy pool and initiate use of the random value in an operation.

16 Claims, 3 Drawing Sheets

(56) References Cited

U.S. PATENT DOCUMENTS

| | | | |
|---|---|---|---|
| 2016/0342394 A1* | 11/2016 | Tsirkin | H04L 9/002 |
| 2016/0345188 A1* | 11/2016 | Chen | H04L 9/0861 |
| 2017/0085654 A1 | 3/2017 | Mikhailov et al. | |
| 2019/0386820 A1* | 12/2019 | Hars | H04L 9/0841 |

OTHER PUBLICATIONS

Ahmed et al., "A Secured Key Generation Scheme Using Enhanced Entropy", IJCSNS International Journal of Computer Science and Network Security, vol. 8, No. 2, Feb. 2008, pp. 236-240.
PCT/US2018/060003 , "International Search Report and Written Opinion", dated Aug. 5, 2019, 10 pages.
Application No. SG11202104633W, Written Opinion, dated Dec. 21, 2022, 8 pages.
Application No. EP18939183.2 , Extended European Search Report, dated Oct. 15, 2021, 7 pages.

* cited by examiner

FIG. 3

DISTRIBUTED ENTROPY SYSTEM AND METHOD

This application is a National Stage of International Application No. PCT/US2018/060003, filed Nov. 9, 2018, of which is herein incorporated by in its entirety.

BACKGROUND

In many instances, the security and cryptographic strength of an operating environment depends on the entropy associated with the randomness used in cryptographic algorithms and security protocols. To meet cryptographic assurances and capabilities, high entropy is desirable.

Providing high entropy and quality pseudorandom number generators (PRNG) in software is difficult. The problem of providing high entropy and secure PRNGs is exasperated by isolation properties in a virtualized environment. For example, a virtual machine (VM) may virtualize hardware resources, thus obfuscating many sources of entropy and creating a highly predictable (i.e., nonrandom) environment.

As pseudorandom number generators (PRNG) are used to facilitate RSA key generation, it might happen that an attacker can obtain a large enough number of probable primes gathered from public keys. The attacker can discover a PRNG seed (or compromise an internal state of the PRNG in some other way) based on the large number of public keys. This would compromise the secrecy of past and future messages. The problem may be amplified when workloads are run on highly virtualized environments which might exhibit a lack of good quality randomness since virtual machines do not have a good entropy source. As such, virtual machines can be even more disadvantaged than hardware. For example, entropy that can be gathered from keystrokes or mouse movements typically does not exist on a VM.

Emulation of hardware further removes randomness and replaces it by behavior that is more predictable (across all VMs), e.g., OS kernel pools emulated data, timers might not have proper resolution, etc.

Embodiments of the invention address this problem and other problems individually and collectively.

SUMMARY

Embodiments of the invention are directed to methods and systems for improving the quality of the entropy available to virtualized application workloads as well as computer nodes in general.

One embodiment is directed to a method comprising: receiving, by a computer node in a network including a plurality of computer nodes, a plurality of data values from the plurality of computer nodes, each computer node creating a data value based on a time that the computer node in the plurality of computer nodes takes to perform a function; providing, by the computer node, the data values or derivatives thereof as random values to an entropy pool of random values; selecting, by the computer node, a random value from the entropy pool; and initiating, by the computer node, use of the random value in an operation.

Another embodiment is directed to a computer node comprising: a processor; a memory device; and a computer-readable medium coupled to the processor, the computer-readable medium comprising code executable by the processor for implementing a method comprising: receiving, by a computer node in a network including a plurality of computer nodes, a plurality of data values from the plurality of computer nodes, each computer node creating a data value based on a time that the computer node in the plurality of computer nodes takes to perform a function; providing the data values or derivatives thereof as random values to an entropy pool of random values; selecting a random value from the entropy pool; and initiating use of the random value in an operation.

Prior to describing specific embodiments of the invention, some terms may be described in detail.

Terms

The term "node" may include a connection point. In some embodiments, a node may be a physical electronic device that is capable of creating, receiving, or transmitting data. In other embodiments, a node may be a software module on a computing device, the software module a connection point in a communication network. A node may be a computer node. In some embodiments, a computer node may be a physical electronic device in a computer network. In other embodiments, a computer node may be a virtual machine run by a computer node cluster.

A "remote computer" may include a computer located remotely in reference to a computer node cluster. A remote computer may be capable of generating interaction data and transmitting the interaction data to a computer node and/or computer node cluster. A remote computer may be may be any suitable device for generating interaction data. A remote computer may generally be located in any suitable location, such as at the location of a merchant. A remote computer may be in any suitable form. Some examples of remote computers include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. A remote computer may use any suitable contact or contactless mode of operation to send or receive data from, or associated with, a computer node cluster, computer node, or any other intermediate computer, for example, an acquirer computer.

An "interaction" may include a reciprocal action or influence. An interaction can include a communication, contact, or exchange between parties, devices, and/or entities. Example interactions include a transaction between two parties and a data exchange between two devices. Interactions can also be agreements, contracts, and the like. "Interaction data" may refer to data associated with an interaction. In some embodiments, interaction data may result from user initiated input. In other embodiments, interaction data may be transaction data.

A "random number" or "random value" may include a numeric sequence that cannot be easily guessed or predicted. For example, a random number may not have any recognizable patter or regularities. A random number may be truly random or pseudorandom. A truly random number can be obtained from a physical phenomenon, for example, from a quantum phenomenon such as radioactive decay. A pseudorandom number can be generated, for example, by a pseudorandom number generator.

A "pseudorandom number generator" (PRNG) may include a function, module, or component designed to generate a sequence of numbers whose properties approximate the properties of a random number. A seed may be an input to a PRNG. In some embodiments, inputting a same seed as previously inputted into a PRNG may result in the same random values as previous generated, whereas inputting a different seed may result in different random values.

"Entropy" may include randomness collected by an operating system or application. Entropy may be collected from an entropy source and stored in an entropy pool. A random number generated from an entropy pool with high entropy cannot be easily guessed or predicted. In some embodiments, entropy may refer to the Shannon entropy and may be defined using the Boltzmann's H-theorem. Entropy may be measured in bits, nats, or bans.

"Entropy source" may include any device, event, or channel that may prove as a source of randomness for generating a random number. Examples of entropy sources may include, but are not limited to, user interaction with a device, network noise, network packets, asynchronous events, mouse events, keyboard events, audio noise, performance counters, memory state, thread timing, etc.

An "entropy pool" can include a group of entropy values. An entropy pool can accumulate and aggregate input from various entropy sources over time. An entropy pool may be accessed by a computer node to retrieve random values. An entropy pool may store entropy in any suitable manner, for example, by storing a large number in a kernel's memory.

A "hashing mechanism" may include the use of a hashing function that can be used to map data of arbitrary size to data of fixed size, with slight differences in input data producing very big differences in output data. The values returned by a hash function are called hash values, hash codes, hash sums, or simply hashes. Hash functions are widely used to generate fixed-length output data. Well known examples of hashing mechanisms include, but are not limited to, SHA-1 (Secure Hash Algorithm-1) and SHA-256 (Secure Hash Algorithm-256) and Message Digest (MD).

An "operating system" (OS) may include a collection of software that manages computer hardware resources and provides common services for applications. The operating system is a vital component of the system software in a computer system. Applications usually require an operating system to function.

A "secure communication channel" may include a networking channel between two entities, such as a server computer and mobile device, that may allow the two entities to communicate with each other through a secure channel without eavesdropping by a third entity, spoofing of the communication by a third entity or masquerading of the third entity as one of the two expected entities participating in the secure communication. Setting up a secure communication channel allows sensitive information such as credit card numbers, social security numbers, login credentials and signaling information for managing the trusted execution environment to be transmitted securely between the two entities. Known techniques, such as secure socket layer (SSL) protocols may be used in establishing a secure communication channel.

A "virtualized environment" may provide isolation between different operating environments sharing the same physical resources. In other words, a virtualized environment provides a logical abstraction of computing resources from physical constraints. One common abstraction is referred to as a virtual machine (also known as guest), or VM, which provides the content running in the VM a direct interface to the physical hardware while maintaining the abstraction. Virtualization technology allows multiple VMs running on the same physical hardware to operate independently and isolated from each other. The one or more VMs on the system are managed by a Virtualized Machine Monitor, or VMM (also known as hypervisor or host). The VMM is a software or firmware layer responsible for hosting and managing virtual machines. The VMM manages the system's processor, memory, and allocates other resources for each VM.

A "function" can include a process performed by a computer node, a device, and/or a virtualized environment. In some embodiments, a function may be a time and/or resource consuming task, wherein a computer node can determine a computation time of the function. In other embodiments, a function may be a process typically performed by a computer node, the function accomplishing a task, wherein the computation time of the function can be determined. A function may be performed by a plurality of computer nodes and may be the same at each computer node. In some embodiments, the function may be a series of mathematical equations and/or problems that the computer node can perform.

As an example, a function can be a proof of work function. A computer node can determine the computer time used to compute the proof of work function. As another example, a function can include processing an interaction and/or a plurality of interactions. A computer node can process a plurality of interactions and determine the computation time used to process the plurality of interactions.

A "data value" can include a value. A data value can be a value received and/or determined by a computer node. For example, a data value can be a length of time taken to perform a function, metadata, transactional data, etc. A data value can be in any suitable form, such as, for example, a timestamp, an integer, a float, a double, etc.

A "payment processing network" may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, and other types of commercial transactions. The payment processing network may include a server computer. The payment processing network may use any suitable wired or wireless network, including the Internet.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may include any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

DETAILED DESCRIPTION

Embodiments of the invention describe generating high quality entropy in a software only or a hardware assisted software environment, such as a virtualized environment. Embodiments of the invention describe creating an entropy pool within the virtualized environment using multiple sources of entropy.

In some embodiments, the entropy pool can aggregate the entropy from one or more entropy sources to provide a tamper-resistant and robust source of entropy for a computer node. Entropy sources may include system events, hardware attributes, OS visible sources, and/or any other entropy sources described herein. In some embodiments, there may be one or more entropy pools. The one or more entropy pools can be pooled in a specific pattern (e.g., nonlinear), for example, a pattern used in Fortuna PRNG.

Additionally, in some embodiments, mechanisms may be provided for measuring and testing the entropy implemented to determine the quality of the entropy. For example, a National Institute of Standards and Technology (NIST) test suite may be integrated in the system to provide a measurement of the quality of the entropy being generated within the virtualized environment, for example, chi squared test for randomness can be included in the NIST test suite.

The entropy (or entropy values) in the entropy pool may be used to generate a random number to be used as an input (i.e., seed) for a PRNG. The output of the PRNG can be used to generate encryption keys, for example, asymmetric RSA encryption keys. For example, in some embodiments, a large number of asymmetric RSA encryption keys may be needed in order to facilitate secure card tokenization during a payment transaction. RSA public keys are used to encrypt a single payload between a cardholder and a payment processing network. The RSA public key may be discarded after use. The public part of the RSA key is available to merchants and passed to the cardholder's device. In other embodiments, the encryption keys can include Elliptic Curve (EC) cryptographic keys (i.e., public keys). The encryption keys can correspond to any suitable encryption techniques.

An external attacker may be capable of harvesting a large number of public keys by, for example, wiretapping merchant communication links or consumer devices. The attacker may be able to determine attributes of the PRNG based on the large number of public keys. The attacker may be capable of predicting a future random value, or a past random value, generated by the PRNG and used to generate a RSA encryption key. Additionally, in some embodiments, if a PRNG is used to generate other values, such as ID(s), nonce(s), etc., then the external attacker can also be capable of harvesting these other values, which can then also be used to attack the PRNG. Embodiments of the invention can utilize additional distributed entropy source(s) to re-seed the PRNG after generation of each cryptographic key.

The seed for a PRNG can be sourced externally to the VM to achieve a strong level of randomness quality thus preventing the attacker from determining attributes of the PRNG and the seeds to the PRNG. Embodiments of the invention provide for collection of entropy from an external entropy source into an entropy pool, which may be used in the generation of encryption keys.

Figure 1:
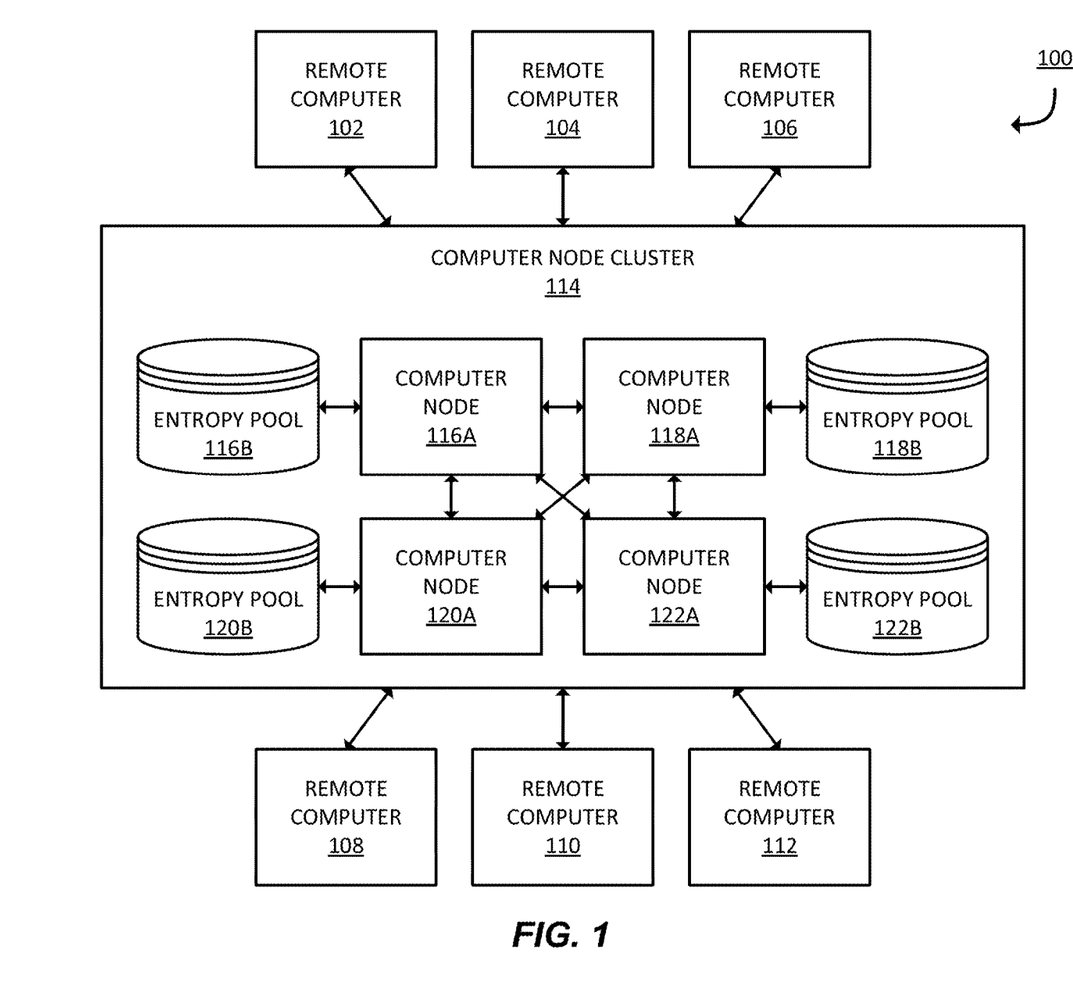
FIG. 1 shows a distributed entropy system according to some embodiments of the invention.

FIG. 1 shows a block diagram of a system 100 comprising a number of components according to some embodiments of the invention. The system 100 comprises remote computers 102-112, a computer node cluster 114, a computer node 116A, a computer node 118A, a computer node 120A, a computer node 122A, an entropy pool 116B, an entropy pool 118B, an entropy pool 120B, and an entropy pool 122B. The remote computers 102-112 may be in operative communication with the computer node cluster 114. In some embodiments, the remote computers 102-112 may be in operative communication with one or more computer nodes. The computer nodes 116A-122A may be in operative communication with one another. Each computer node may be in operative communication with an associated entropy pool. For example, the computer node 116A may be in operative communication with the entropy pool 116B.

The components of system 100 can communicate with one another via any appropriate means, including a communications network. Messages and other communications between the databases, data processor, and data sources may be in encrypted or unencrypted form. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as but not limited to a Wireless Application Protocol (WAP), I-mode, and/or the like); and/or the like. Messages between the devices and computers may be transmitted using a secure communications protocol such as, but not limited to, File Transfer Protocol (FTP); Hypertext transfer Protocol (HTTP); Secure Hypertext Transfer Protocol (HTTPS), Secure Socket Layer (SSL) and/or the like.

The remote computers 102-112 may be any suitable remote computer remotely located in reference to the computer node cluster 114. The remote computer may be capable of generating interaction data and also transmitting the interaction data to the computer node cluster 114 and/or to one or more computer nodes. For example, the remote computers 102-112 may be access devices that may transmit transaction data to the computer node cluster 114 via a transport computer after initiating a transaction with a consumer (i.e., user).

In some embodiments, the computer node cluster 114 may be a hypervisor capable of managing a plurality of virtual machines. The computer nodes 116A-122A may be VMs run by the hypervisor. The computer node cluster 114 may be referred to as a host machine while the computer nodes 116A-122A may be referred to as guest machines. The hypervisor may be capable of presenting the guest machines with a virtual operating platform and may be capable of managing the execution of the guest machines. Multiple instances of a variety of operating systems may share virtualized hardware resources. The operating systems may be, for example, Linux, Windows, and macOS. In some embodiments, the hypervisor may perform operating-system-level virtualization, wherein the instances, typically called containers, can share a single kernel. Those skilled in the art should recognize that the hypervisor and virtual machines can be set up and/or initialized in any suitable manner. The hypervisor may include a hypervisor CPU scheduler that can be independent from the VMs. In other embodiments, the computer node cluster 114 may be a computer network operatively connecting computer nodes 116A-122A which may be server computers.

The computer node cluster 114 may be a payment processing network or a part of a payment processing network. A large number of users may perform transactions at remote computers. Transaction data from the transactions may be routed from remote computers to the payment processing network. It can be assumed that in a large population of events (e.g., transactions), the exact time of transaction cannot be predicted and is actually random. The transaction data may travel via a heterogeneous network, which may result in randomizing the arrival time as well as load distribution at the payment processing network. Since a CPU has a limited processing capability the throughput may depend on a nondeterministic load. As such, the computer nodes may process transaction data and other operations, such as functions, in varying amounts of time.

The entropy pools 116B-122B may be a device, database, file, and/or persistent storage capable of storing entropy. An entropy pool can accumulate and aggregate input from various entropy sources over time. An entropy pool may be accessed by a computer node to retrieve random values. In some embodiments, an entropy pool can store a plurality of random values derived from input from an entropy source. An entropy pool may store entropy in any suitable manner, for example, by storing a large number in a kernel's memory. The large number may be a hash of various input entropy sources. The large number may be, for example, a 4096 bit number, or the like. If the large number is a 4096 bit number, then there may be 24096 possibilities for this number so it can contain up to 4,096 bits of entropy.

Figure 2:
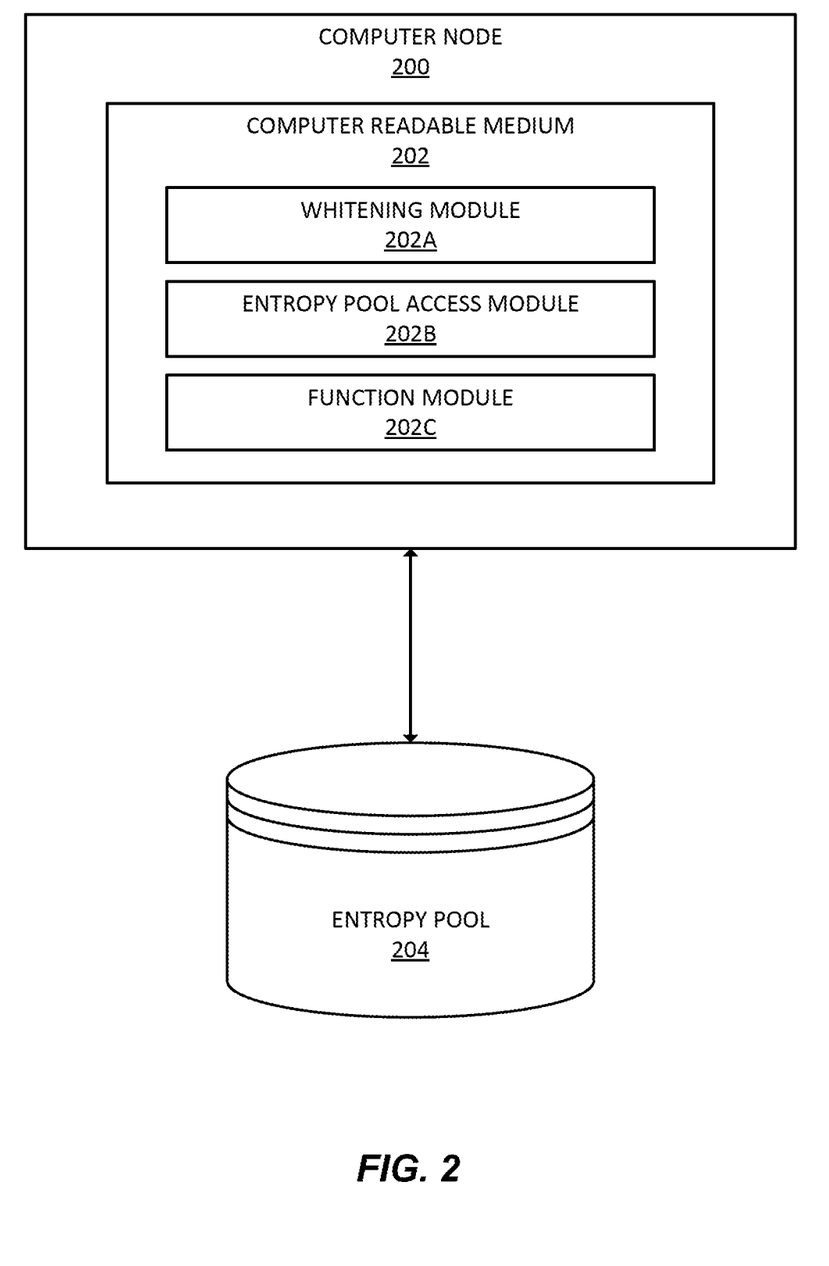
FIG. 2 shows a system block diagram of a computer node according to some embodiments of the invention.

FIG. 2 shows a block diagram of a computer node 200 according to some embodiments of the invention. The exemplary computer node 200 may comprise a computer readable medium 202 comprising a whitening module 202A, an entropy pool access module 202B, and a function module 202C. The computer node 200 may be operatively coupled to an entropy pool 204, as described above.

The computer readable medium 202 may comprise code, executable by the computer node 200, to implement a method comprising: receiving a plurality of data values from a plurality of computer nodes, each computer node creating a data value based on a time that the computer node in the plurality of computer nodes takes to perform a function; providing the data values or derivatives thereof as random values to an entropy pool of random values; selecting a random value from the entropy pool; and initiating use of the random value in an operation.

The whitening module 202A may comprise software code that can perform, in conjunction with a processor, a whitening process. For example, the whitening module 202A may perform a whitening transformation that can transform a vector of random variables, such as differences in data values measured at different computer nodes, into a new set of variables with a covariance equivalent to the identity matrix, meaning that they are uncorrelated and each have variance 1. A whitening process can remove underlying correlation in a set of data. For example, if a entropy source were to generate values of 0 and 1 at a ratio of 55% 0's and 45% 1's, the data generated by the entropy source could be whitened to remove bias from the generated data. Thus, the resulting entropy values may not be biased towards 0's or 1's.

As an example of a whitening process, suppose X is a random (column) vector with non-singular covariance matrix M and mean 0. X may comprise data values determined by the computer node 200. The transformation $Y=WX$ with a whitening matrix W satisfying the condition $W^TW=M^{-1}$ yields the whitened random vector Y with unit diagonal covariance. There can be many possible whitening matrixes W that satisfy the above condition. Commonly used choices are $W=M^{-1/2}$ (i.e., Mahalanobis or ZCA whitening), the Cholesky decomposition of $M^{-1}$ (i.e., Cholesky whitening), the Eigen-system of M (i.e., PCA whitening), or any other suitable whitening matrix W. In other embodiments, the whitening module 202A may perform any suitable whitening process as known by one of skill in the art.

The entropy pool access module 202B may comprise software code that can generate random values from an entropy pool. In some embodiments, the entropy in the entropy pool may decrease each time a random value is generated. The entropy pool access module 202B may allow the computer node 200 to generate random values based on the entropy stored in the entropy pool The function module 202C may comprise software code that can run a function. The function module 202C may perform the function while the computer node 200 processes interaction data received from a remote computer. A function may be a time and resource consuming task. The function may be performed by a plurality of computer nodes and may be the same at each computer node. In some embodiments, the function may be a series of mathematical equations and/or problems that the computer node 200 performs. For example, the computer node 200 may calculate $10^{10}/i$ for values of $i \in [0,10^{10}]$. However, it is understood that other functions may be of varying difficulty, and may be easier or harder than this example. In other embodiments, the function may include the computer node 200 determining a nonce to a hash function that results in a hash value less than a difficulty value. After performing the function, the function module 202C may determine a length of time taken to perform the function.

In some embodiments, the computer node 200 may perform the function while processing interaction data. Since the interaction data can vary between computer nodes and the computer nodes may have different resources, the length of time taken to perform the function can vary between computer nodes. For example, there may be 5 computer nodes in the computer node cluster. Each computer node may take the following computation times to perform the function in parallel with processing interaction data: 5.123456 seconds, 5.123421 seconds, 5.123399 seconds, and 5.123482 seconds.

The entropy pool 204 may be any suitable entropy pool as described herein. Each computer node 200 in a computer node cluster can be associated with an entropy pool 204, thus the entropy in the computer node cluster is said to be gathered in a distributed fashion. In some embodiments, the entropy collected in the entropy pool 204 of a computer node 200 may not be shared with the other computer nodes in the computer node cluster, rather, entropy at the entropy pool 204 may be used as input to a PRNG local to the computer node 200. The PRNG can be used to generate RSA keys with continuous reseeding from the entropy pool, the one-time-use RSA keys generated by the computer node 200 may not contain any information (e.g., co-generated probable primes) usable by an attacker to attack other keys.

In some embodiments, the computer node 200 may further comprise a processor. The processor may be coupled to one or more output elements, one or more input elements, the non-transitory computer readable medium 202, a secure memory, and a network interface. The one or more output elements may comprise any suitable device(s) that may output data. Examples of output elements may include display screens, speakers, and data transmission devices. The one or more input elements may include any suitable device(s) capable of inputting data into the computer node 200. Examples of input devices include buttons, touchscreens, touch pads, microphones, etc.

The secure memory may store encryption keys, interaction data, and any other relevant data securely. The secure memory may be in the form of a secure element, a hardware security module, or any other suitable form of secure data storage.

The network interface may include an interface that can allow the computer node 200 to communicate with external computers. Network interface may enable the computer node 200 to communicate data to and from another device (e.g., another computer node, a remote computer, etc.). Some examples of network interface may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface may include Wi-Fi™.

Data transferred via network interface may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Embodiments of the invention allow for a supplementary entropy pool that can, in some embodiments, be mixed with OS-provided entropy to strengthen the quality of a PRNG seed used to generate pseudorandom output. First, the OS-provided entropy will be described.

According to some embodiments of the invention, computer nodes may be configured to receive input from a variety of entropy sources, such as mouse events, thread timing, audio noise, keyboard events, network packets, performance counters, memory state, interrupt events, etc. The entropy pool can accumulate and aggregate input from various entropy sources over time.

As an example, a user may press keys on a keyboard operatively coupled to a computer node. The keypresses can generate interrupts. An interrupt can be a signal to the processor that is emitted by hardware or software indicating an event. The interrupt can be processed by an interrupt handler, which may depend on the type of hardware, e.g., USB keyboard, PS/2 keyboard, etc. A kernel of the computer node may use timing values between successive interrupts to feed the entropy pool (e.g., via add_keyboard_randomness( )). Applications can read from the entropy pool (e.g., via /dev/random and/dev/urandom). In this way, the applications may have access to random values, and may initiate operations with the random values.

For each entropy source, an interrupt handler on the computer node may filter the received input over time and temporarily store the input in a entropy pool. For example, for an entropy source, the interrupt handler may receive several different classes of interrupts that include synchronous (e.g., periodic) and asynchronous (e.g., non-periodic) interrupts. In some embodiments, the interrupt handler may be configured to filter out synchronous interrupts and store information associated with asynchronous interrupts, since at least in some instances asynchronous interrupts may have a higher entropy associated with them. In other embodiments, the interrupt handler may store a timestamp associated with the arrival of the interrupt. In other embodiments, the interrupt handler may store timestamps for multiple interrupts before normalizing the input. For different entropy sources, the interrupt handler may have different rules either encoded or configured for filtering out information from the various entropy sources. Another example may include filtering out virtualization events deliberately caused by code running inside the VM, such as VMexit causing instructions executed by code residing in the VM.

In some embodiments, the input received from different entropy sources may be normalized with each other. For example, a first entropy source may capture the timestamp for an interrupt, whereas a second entropy source may capture the number of interrupts that occurred during a specified period (measured in time or instructions executed). The data format may be different for these two input method used by the computer node. In some embodiments, the input from each source stored in the computer node may be normalized by padding (i.e., adding bits) or chopping (i.e., removing bits) of the input data to normalize the data to a fixed length output. In other implementations, the input data may be normalized by hashing the input to a fixed length output.

The normalized input data from each entropy source may be accumulated over time in an entropy pool. In some implementations, the normalized data for each entropy source can be hashed together with the previous data accumulated for each entropy source. In other words, the new entropy input coming in over time for each entropy source can be merged together, using techniques such various hashing mechanisms. In some instances, the entropy associated with an entropy source may improve as more entropy data is merged together or accumulated over time. In some implementations, the accumulated values are reset based on a pre-configured time. In other implementations, the accumulated values may be reset upon being used as input to a PRNG and generating the PRNG random values. In yet other implementations, the accumulated values may be reset in a variety of ways without departing from the scope of the invention or not reset at all.

Embodiments of the invention allow for entropy collection that can provide high quality entropy that may be mixed with entropy available at the kernel level (i.e., OS-provided entropy). Next, a distributed entropy system and method according to embodiments of the invention will be further described. In some embodiments, a computer node may mix the OS-provided entropy, as described above, with entropy from entropy sources, as described below, into an entropy pool.

Embodiments of the invention can take advantage of an effect that functions have on network latency and calculation processing time. The functions can be performed by a plurality of computer nodes. Each computer node may process the function in a different amount of time as another computer node. Embodiments may use a distributed clustered environment to perform computations that either yield some randomness and/or have finite and non-trivial execution time. A computer node can take the difference in the computation time of those operations (i.e., function) compared to the computation time of other computer nodes in the computer node cluster (both local and remote) and use microsecond timers to derive entropy. In some embodiments, the computer node can perform a whitening algorithm on the measured computation time and/or the differences between computation times to remove bias from the entropy.

Next, the randomness of the difference in computation time of the function will be discussed. The difference in computation time can be a random process since the computer nodes may be run on hypervisors that perform various tasks (i.e., functions) that are outside the control of a single VM, application, or even attacker, thus causing collateral variance in calculation performance by the computer nodes. The network traffic, and in some embodiments latency, on the hypervisor can be random from a viewpoint of a single VM. Functions can be a hidden reality from the point of view of a single VM running an entropy harvest, for example, one VM may not have access to another VM's function. As an example of this, each VM can execute a function in N number of CPU cycles. However, the cycles can be stolen by other VMs. The VM may not be aware of the missing cycles, unless the VM compares execution time in cycles with an absolute, real time. Therefore, other workloads that increase task duration can be hidden from that specific VM, but execution time measured in real-time can vary between executions. The above contributes to a non-deterministic duration of calculations of a distributed function. Measurement of the length of time of these operations can yield values that will be of random nature. The chaotic structure of modern datacenters' workloads can contribute to varied timings that can feed the entropy collectors and pools. That is why each VM may have slightly different view on event timing and computation time measurements can yield significant measure error to be used as an entropy source.

Each computer node can receive the computation time from the other computer nodes and can then determine a difference between each of the times. In some embodiments, the computer node may truncate the different measurements of the computation time to a predetermined number of digits, for example, 4 digits, 3 digits, 2 digits, 1 digit, etc. In this way, the computer node can determine the least significant digits of the differences in computation time. Proper whitening techniques on the least significant digits can further achieve good quality randomness.

As per handling a large number of external requests from remote computers, the measurement of a new request arrival and their hashed payloads (i.e., interaction data) can be completely independent from workloads. The source of the interaction data can be the real-world behavior of millions of users and cannot be predicted at the micro-level. The user's physical behavior can drive the variable load on the system, causing enough disturbance in the infrastructure to provide high quality entropy by measuring specially crafted functions. Additionally, high quality entropy can be obtained by observing data, such as metadata. For example, metadata can include cardholder names associated with performed transactions. The first letter of each cardholder name from each transaction can be compiled into a random string. This random string may have a letter frequency similar to a distribution of first letter names in the world, country, state, etc. that the transactions are performed in, however, the random sting will be completely random.

Figure 3:
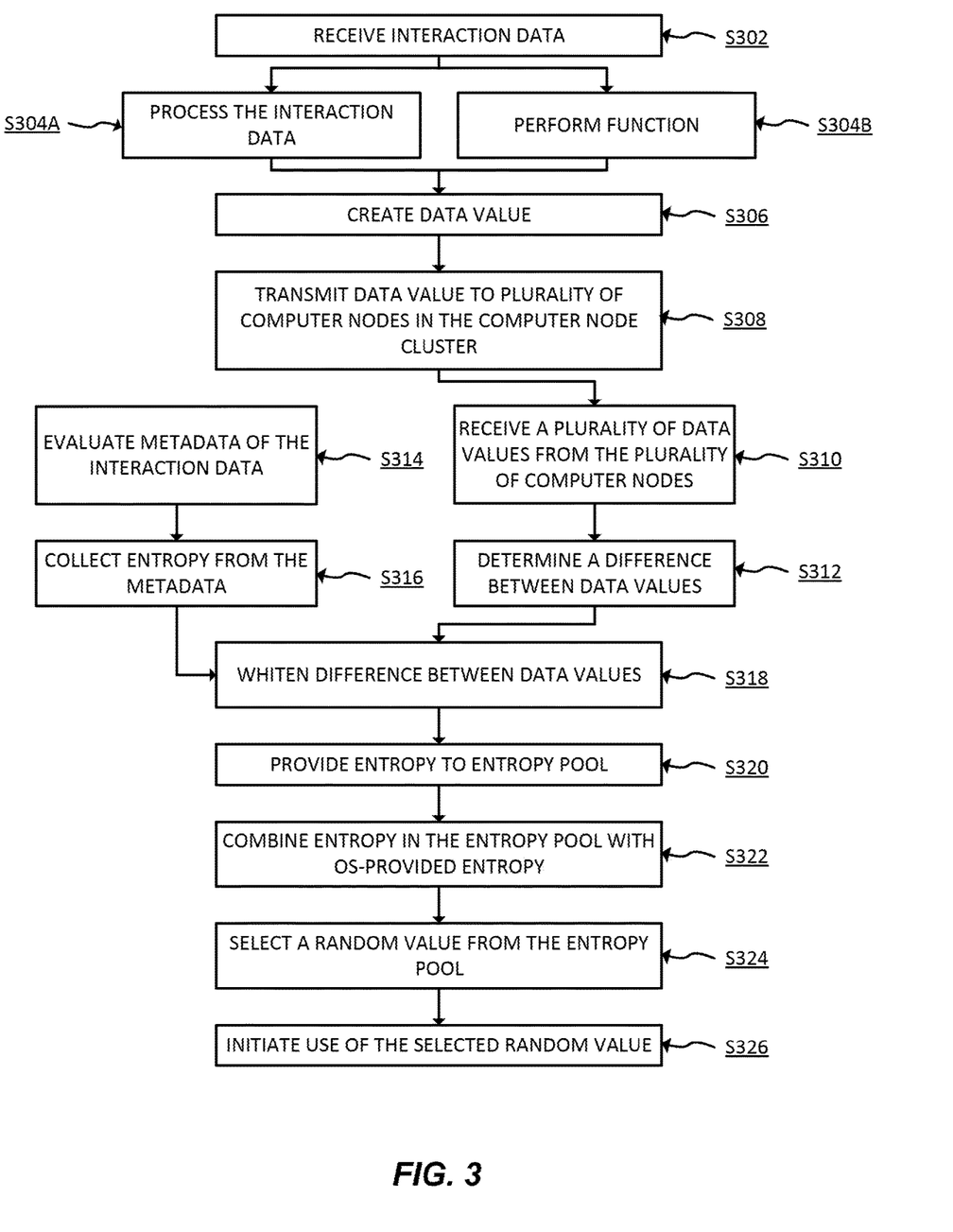
FIG. 3 shows a flowchart of an entropy generation method according to some embodiments of the invention.

FIG. 3 shows a flowchart of an entropy generation method according to an embodiment of the invention. The method illustrated in FIG. 3 will be described in the context of a computer node cluster receiving interaction data from remote computers and computer nodes, running as virtual machines on the computer node cluster, deriving entropy from the interaction data. It is understood, however, that the invention can be applied to other circumstances (e.g., receiving other types of data, computer nodes comprising hardware and directly receiving data from the remote computers, etc.). Although the steps are illustrated in a specific order, it is understood that embodiments of the invention may include methods that have the steps in different orders. In addition, steps may be omitted or added and may still be within embodiments of the invention.

At step S302, a computer node in a computer node cluster may receive interaction data from a remote computer. For example, in reference to FIG. 1, the computer node 116A may receive interaction data from the remote computer 102. In some embodiments, the computer node cluster 114 may receive interaction data from one or more remote computers, e.g., remote computer 102-112. The computer node cluster 114 may distribute interaction data to the computer nodes, e.g., computer node 116A, computer node 118A, computer node 120A, and computer node 122A. The computer node may receive the interaction data from the computer node cluster 114.

At step S304A, after receiving the interaction data, the computer node can process the interaction data. The computer node can be capable of processing any suitable interaction data. For example, if the interaction data is transaction data, then the computer node can process the transaction data. The computer node may perform certificate authority services, authorization services, exception file services, and clearing and settlement services. In some embodiments, the computer node may be capable of authenticating a user associated with the interaction data. In some embodiments, the interaction data received by a computer node from a computer node cluster may include interaction data from a plurality of remote computers. For example, the computer node cluster may receive interaction data from at least 10,000 remote computers. The computer node cluster may group interaction data, in any suitable manner, and then transmit the group of interaction data to the computer node. The computer node may process the group of interaction data, which can include, for example, interaction data from at least 2000 remote computers.

As another example, the interaction data may be access data resulting from a user requesting access to a system at a remote computer. The computer node can receive and process the access data by, for example, determining whether to allow the user to access the system.

Step S304B may be performed in parallel with step S304A. While the computer node is processing the interaction data, the computer node can also perform a function. The function may be a time and resource consuming task. In some embodiments, the function may be preprovisioned to the computer node via the computer node cluster. Each computer may perform the same function. In some embodiments, the function may be a series of mathematical equations and/or problems that the computer node performs. For example, the computer node may calculate $10^{10}/i$ for values of $i \in [0, 10^{10}]$. The function may be any other suitable workload as described herein. As another example, the function may involve factoring a number into two or more prime numbers.

At step S306, after processing the interaction data and performing the function, the computer node can create a first data value. The first data value may be the length of time taken to perform the function. The computer node can determine the first data value by measuring the computation time of the function. The function computation time can be impacted by the computer node cluster and the individual computer nodes' utilization from co-hosted tasks.

At step S308, after creating the first data value, the computer node can transmit the first data value to a plurality of computer nodes in the computer node cluster. For example, in reference to FIG. 1, the computer node 116A may transmit the first data value to the computer node 118A, the computer node 120A, and the computer node 122A. The computer node can transmit the first data value to any suitable number of other computer nodes. For example, the computer node may transmit the first data value to all other computer nodes in the computer node cluster. In some embodiments, transmissions between computer nodes may be facilitated by the computer node cluster.

At step S310, the computer node can receive a plurality of data values from the plurality of computer nodes. For example, in reference to FIG. 1, the computer node 116A may receive a data value from the computer node 118A, the computer node 120A, and the computer node 122A. The other computer nodes may be able to run the same function, determine the computation time of the function, and transmit the computation time (i.e., data value) to each of the other computer nodes. All clock skews and chaotic loads on the computer nodes of the computer node cluster can contribute to non-deterministic and chaotic output of those operations. In other words, the data value determined by each computer node may be different.

At step S312, after receiving a plurality of data values, the computer node can determine a difference between the first data value and each data value of the plurality of data values. For example, if the computer node received a plurality of data values including three data values, then the computer node can determine the difference between the first data value and each of the three data values of the plurality of data values, resulting in three differences between data values.

As an example, the computer node may create a first data value of 4.123456 seconds at step S306. The computer node may receive a plurality of data values including the data values of 4.123502 seconds, 4.123813 seconds, and 4.123279 seconds at step S310. The computer node can then determine the difference between the first data value and each data value of the plurality of data values, and may adjust the values by removing leading zeros; the differences may be 046, 357, and 177 with respect to this example.

At step S314, in some embodiments, the computer node can evaluate metadata of the interaction data. The type of metadata may be based on the type of interaction data. The metadata may be, for example, a timestamp of the interaction, a timestamp of transmission and/or reception, a size of the data, a transaction amount, a means of creation of the data, a purpose of the data, a creator of the data, a data quality, keywords, and/or any other suitable metadata. The computer node can determine if the interaction data includes metadata that is highly variable between different interaction data, for example, the microseconds of the timestamp.

At step S316, in some embodiments, after evaluating the metadata, the computer node can collect entropy from the metadata. If the metadata includes timestamps, then the computer node can collect a predetermined number of least significant digits of the timestamps. For example, the timestamps may be in a format such as 12:34:56.123456. The computer node can collect the three least significant digits of the timestamp, e.g., 456. The computer node can collect any suitable number of digits from the timestamp as entropy for the entropy pool.

At step S318, after the computer node determines the difference between data values at step S312, the computer node may perform a whitening process with the differences between data values. In some embodiments, the computer node may perform whitening after collecting entropy from the metadata, at step S316. The computer node can whiten the difference between data values as well as whiten the metadata. The computer node may perform whitening in any suitable manner as described herein. The result of whitening the differences between data values and/or metadata can result in entropy.

At step S320, after whitening the difference between data values, the computer node can provide entropy to an entropy pool. For example, in reference to FIG. 1, the computer node 116A can provide entropy to the entropy pool 116B. The entropy from the data values can be provided to the entropy pool as random values. In some embodiments, the computer node can hash together the differences between data values with the data currently stored in the entropy pool. In some embodiments, the computer node may provide the plurality of data values or derivatives thereof (i.e., whitened values) as random values to the entropy pool of random values. In some embodiments, replenishing the entropy pool may be referred to as stirring. Entropy from entropy sources can be stirred into the mix of bits in the entropy pool.

At step S322, in some embodiments, the computer node may combine the entropy in the entropy pool with OS provided entropy. The computer node may hash the entropy from the OS provided entropy with the entropy of the entropy pool. The computer node may store the result of hashing the entropy from different entropy sources into the entropy pool. For example, the computer node can hash together the entropy derived from the differences in computation time of a function with the OS provided entropy derived from an entropy source such as a memory state, thread timing, audio noise, network packets, performance counters, and/or the like. In some embodiments, the computer node can use a SHA (Secure Hashing Algorithm) hashing mechanism, and in other embodiments a MD (Message Digest) hashing mechanism, for combing entropy from several entropy sources. For example, for achieving higher quality entropy a SHA-2 hashing mechanism may be used for processing the entropy sources, instead of an MD hashing mechanism. A property of entropy can be that it mixes well. The computer node can mix the entropy from two or more unrelated entropy sources, the resulting new entropy stream cannot have less entropy than the inputs.

At step S324, the computer node can select a random value from the entropy pool. The computer node can select a random value in any suitable manner. For example, the entropy pool may contain a stream of values; the computer node can select the last n values of the steam of values. After the computer node selects the last n values, the remaining values may be mixed using techniques such various hashing mechanisms. The selected random value can be of any suitable size, such as 32-bits, 40-bits, 56-bits, 64-bits, 128-bits, 256-bits, etc.

In some embodiments, the computer node may determine the quality of the entropy of the selected random value. For example, the computer node may analyze several selected random values and identify if the computer node may be generating identifiable patterns within the random value or over several random value generations. As another example, the computer node may detect duplication of values or a sequence of values within the selected random value or over several random value generations.

At step S326, after selecting a random value from the entropy pool, the computer node can initiate the use of the selected random value. In some embodiments, initiating the use of the selected random value can comprise the computer node inputting the selected random value into a pseudorandom function generator that outputs a second random value. The selected random value can be a seed that can be inputted into the pseudorandom function generator. After generating the second random value, the computer node can generate encryption keys using the second random value.

In some embodiments, the computer node may use the second random value rather than the selected random value from the entropy source to generate encryption keys. The entropy pool may produce a limited number of random bits per second. In order to increase the data rate, the selected random value can be used to seed a faster cryptographically secure pseudorandom function generator, which then generates the second random value.

The selected random value and/or the second random value can be used for any suitable purpose, application, and/or operation, such as, for example, lotteries, gambling machines, video games, image processing and reconstruction, music and graphics composition, scientific and financial modeling simulation, program and algorithm testing, equation-solving, and computer security applications such as cryptography, digital signatures, and protected communication protocols.

In other embodiments, in the use of a gambling machine, initiating the use of the selected random value can comprise presenting a user with 5 reels on a display, each reel comprising 12 symbols. The user may select a button or pull a lever to initiate a spin of the 5 reels, the button, for example, may state "spin," "go," etc. Each of the 12 symbols may be associated with an integer from 1-12. When the user initiates a spin, the computer node can use the selected random value, which is in a range of 1-12, to select a symbol associated with the selected random value. The computer node may end the spin of the reel and display the symbol associated with the selected random value. The computer node may use additional random values for the remaining reels. If the combination of the selected symbols matches a predetermined pattern of symbols the user may win a predetermined prize.

In yet other embodiments, initiating the use of the selected random value can comprise determining a second random value from a PRNG, wherein the input to the PRNG (i.e., the seed) is the selected random value. The computer node can then use the second random value to determine the outcome of a lootbox or other digital item in a massively multiplayer online (MMO) game. In this embodiment, the remote computers may be personal computers of gamers and the interaction data may be login data, logout data, crash reports, player activities in the game, and/or the like.

Next, several examples will be further discussed. In some embodiments, the interaction data may be transaction data. The computer nodes may use metadata in the transaction data to generate entropy. According to embodiments of the invention, a remote computer can present a webpage to a user, in which the user initiates a transaction. The remote computer can employ a counter that adds a counter value (e.g., 1, 2, 3, . . . , etc.) to each subsequent webpage (i.e., payment page) that is presented to the users. As the time to enter payment details varies between users, the computer node cluster can receive the counter value with transaction data in a random order (also after a random time). In some embodiments, the counter value may be metadata including in the interaction data. A computer node can evaluate the metadata (i.e., the counter value) and can then collect entropy from the metadata. For example, the computer node can concatenate, or otherwise combine, the computer values from the received transaction data. The combined counter values may be a random number due to the random order in which the values are received. The computer node may add the entropy to an entropy pool, as described herein.

For example, the computer node may receive transaction data regarding 10 transactions. The metadata may include the counters from 0-9. The computer node may receive the transaction data in an order such that the counters are in the following order: 0, 5, 2, 3, 7, 9, 1, 4, 8, 6. The altered order of the counters can especially be altered when some user interaction is performed, such a user entering a card number, an address, a game code, a press of a button, and/or any other suitable user input, since different users can perform the user interaction in different amounts of time. The computer node add entropy from the metadata to the entropy pool. For example, the computer node may hash a value of 0523791486 with the existing data in the entropy pool. In some embodiments, the computer node may first perform a whitening process on the value 0523791486 and other data values received from other computer nodes before storing the entropy in the entropy pool. The computer node may then select a random value from the entropy pool and input the selected random value as a seed into a PRNG. The PRNG may output a second random value used to generate asymmetric RSA encryption keys which may be used to encrypt further communications regarding and/or including the transaction data.

As another example, the system may use transaction metadata to generate entropy. In some embodiments, the remote computers may be point-of-sale (POS) terminals which may add a timestamp of when a card swipe occurs to transaction data transmitted in authorization request messages to the computer node cluster. The timestamp may, for example, be in a format of 12:34:56.123456, or other suitable format, which is measured with a 1/1.000.000 second accuracy. The computer nodes can evaluate the timestamps (i.e., metadata in the interaction data) and collect the least significant digits of the timestamp, which can be used as source of randomness. POS clocks are not very well synchronized, thus further randomizing the timestamps. The computer nodes can collect entropy from timestamps in the metadata.

As yet another example, a transaction's impact on computation time can be used to generate entropy. First, assume that the entropy discovery task (i.e., function) uses a total of 10,000 calculations and can be processed on any different 5 computer nodes in sequence (i.e., 2000 calculations per computer node). Further, assume that processing a single transaction uses between 500 and 1,000 calculations (depending on what the user requested, what type of card they have, etc.). Also, assume that a single computer node may have capacity of 4,000 calculations per second. The computer node may on average process 4 transactions concurrently. This means that, on average, 3,000 calculations per second are utilized by transaction processing, leaving, on average, a spare calculation capacity of 1,000 calculations per second. When the entropy discovery task is run periodically it may consume spare calculation capacity from 5 computer nodes and, depending on actual node utilization, the entropy discovery task can spend 2 seconds or more on every computer node. The minimum total execution time for the entropy discovery task may be 5 seconds, assuming transaction processing utilized no more than 2,000 calculations from each computer node. The actual time can be higher due to computer nodes being busy with transaction processing as well as due to cluster utilization varying due to variability that cardholders provide. Multiple entropy discovery tasks may be performed. The computer nodes may use the variability of the task duration to discover randomness in cardholder behaviors. Entropy can be derived, as described above, from the differences between how long a computer node takes to run the entropy discovery task. For simplicity of the above numbers, it can be assumed that computation on a computer node is not run in parallel, however, it is understood that computations may be run in parallel on computer nodes in some embodiments of the invention.

Embodiments of the invention have a number of advantages. For example, embodiments of the invention allow computer nodes to obtain high quality entropy based on unpredictable real-world events. The obtained entropy can be mixed with OS-provided entropy, thus strengthening the entropy pool of the computer node. Further, the computer node can use random values from the entropy pool as input to a PRNG, thus randomly changing the seed of the PRNG. In this way, an attacker who has intercepted a large number of public keys, generated as a result of the random number of the PRNG, will not be able to predict other future, as well as past, public keys.

Another advantage is that, according to embodiments of the invention, a computer node that is a virtual machine, which typically do not have a good entropy source since they can comprise emulated hardware, can harvest entropy from differences in computation time of a function between multiple virtual machines. The quality of entropy in the entropy pool of the virtual machine is increased due to the randomness of computation times.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
receiving, by a computer node from a remote computer, interaction data, wherein the computer node is in a network including a plurality of computer nodes;
processing, by the computer node, the interaction data in parallel with performing a function;
determining, by the computer node, a first data value based on the function, wherein the first data value is a time that the computer node takes to perform the function;
receiving, by the computer node from the plurality of computer nodes, a plurality of data values, each of the plurality of computer nodes creating a data value of the plurality of data values based on a computation time that a corresponding computer node in the plurality of computer nodes takes to perform the function;
providing, by the computer node, the plurality of data values or derivatives of first data values as random values to an entropy pool of random values, the first data values being determined based on the first data value and the plurality of data values;
selecting, by the computer node, a selected random value from the entropy pool; and
initiating, by the computer node, use of the selected random value in an operation.

2. The method of claim 1 further comprising:
evaluating, by the computer node, metadata of the interaction data;
collecting, by the computer node, entropy values from timestamps in the metadata; and
providing, by the computer node, the entropy values or derivatives thereof as the random values to the entropy pool.

3. The method of claim 1 further comprising:
determining, by the computer node, a corresponding difference value between the first data value and each of the plurality of data values,
wherein the derivatives of the first data values are respectively determined based on the corresponding difference value between the first data value and each of the plurality of data values.

4. The method of claim 1, wherein the initiating the use of the selected random value in the operation further comprises:
inputting the selected random value into a pseudorandom function generator that outputs a second random value; and
generating one or more encryption keys using the second random value.

5. The method of claim 1, wherein the operation relates to at least one from among lottery operations, gambling machine operations, video game operations, image processing and reconstruction operations, music composition options, graphics composition operations, scientific modeling simulations, financial modeling simulations, program and algorithm testing operations, and equation-solving operations.

6. The method of claim 1, wherein the plurality of data values are a plurality of random values received from the plurality of computer nodes.

7. The method of claim 1, wherein the selected random value is a random number.

8. The method of claim 3, further comprising:
whitening, by the computer node, the corresponding difference value between the first data value and each of the plurality of data values to obtain the derivatives of the first data values.

9. A computer node comprising:
a non-transitory computer-readable medium comprising code for implementing a method including:
receiving, from a remote computer, interaction data, wherein the computer node is in a network including a plurality of computer nodes;
processing the interaction data in parallel with performing a function;
determining a first data value based on the function, wherein the first data value is a time that the computer node takes to perform the function;
receiving, from the plurality of computer nodes, a plurality of data values, each of the plurality of computer nodes creating a data value of the plurality of data values based on a computation time that a corresponding computer node in the plurality of computer nodes takes to perform the function;
providing the plurality of data values or derivatives of first data values as random values to an entropy pool of random values, the first data values being determined based on the first data value and the plurality of data values;
selecting a selected random value from the entropy pool; and
initiating use of the selected random value in an operation.

10. The computer node of claim 9, wherein the method further comprises:
evaluating metadata of the interaction data;
collecting entropy from timestamps in the metadata; and
providing the entropy or derivatives thereof as the random values to the entropy pool.

11. The computer node of claim 9, wherein the method further includes:
determining a corresponding difference value between the first data value and each of the plurality of data values,
wherein the derivatives of the first data values are respectively determined based on the corresponding difference value between the first data value and each of the plurality of data values.

12. The computer node of claim 9, wherein the initiating the use of the selected random value in the operation further includes:
inputting the selected random value into a pseudorandom function generator that outputs a second random value; and
generating one or more encryption keys using the second random value.

13. The computer node of claim 9, wherein the operation relates to at least one from among lottery operations, gambling machine operations, video game operations, image processing and reconstruction operations, music composition options, graphics composition operations, scientific modeling simulations, financial modeling simulations, program and algorithm testing operations, and equation-solving operations.

14. The computer node of claim 9, wherein the plurality of data values are a plurality of random values received from the plurality of computer nodes.

15. The computer node of claim 9, wherein the selected random value is a random number.

16. The computer node of claim 15, wherein the method further includes:
    whitening the corresponding difference value between the first data value and each of the plurality of data values to obtain the derivatives of the first data values.

\* \* \* \* \*